Figure 1:
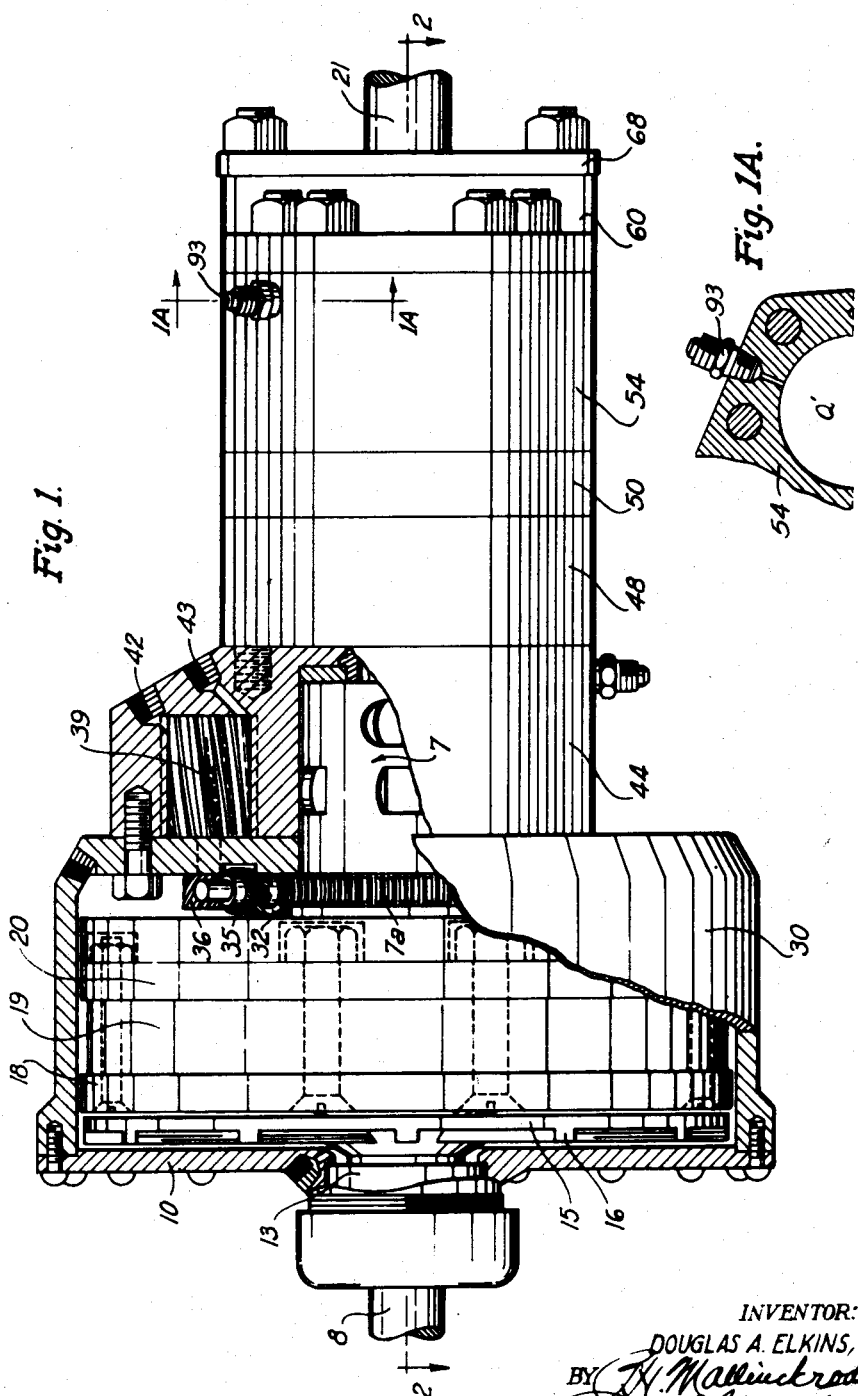

July 21, 1953 D. A. ELKINS 2,645,901
ROTARY PUMP AND MOTOR HYDRAULIC TRANSMISSION
Filed July 27, 1948 9 Sheets-Sheet 1

INVENTOR:
DOUGLAS A. ELKINS,
BY

INVENTOR:
DOUGLAS A. ELKINS,

July 21, 1953  D. A. ELKINS  2,645,901
ROTARY PUMP AND MOTOR HYDRAULIC TRANSMISSION
Filed July 27, 1948  9 Sheets-Sheet 4

INVENTOR:
DOUGLAS A. ELKINS,

July 21, 1953   D. A. ELKINS   2,645,901
ROTARY PUMP AND MOTOR HYDRAULIC TRANSMISSION
Filed July 27, 1948   9 Sheets-Sheet 5

INVENTOR:
DOUGLAS A. ELKINS,

July 21, 1953  D. A. ELKINS  2,645,901
ROTARY PUMP AND MOTOR HYDRAULIC TRANSMISSION
Filed July 27, 1948   9 Sheets-Sheet 6

INVENTOR:
DOUGLAS A. ELKINS,

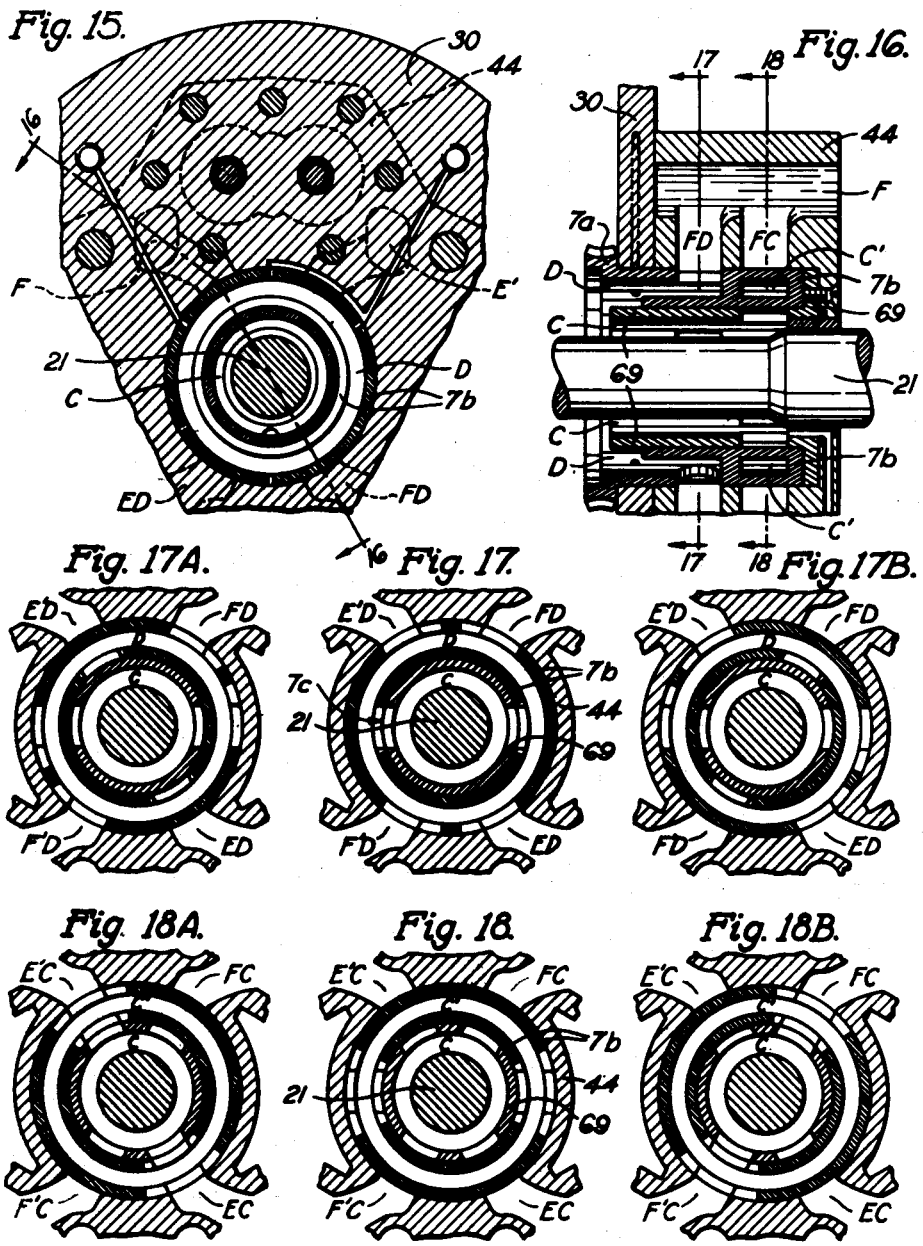

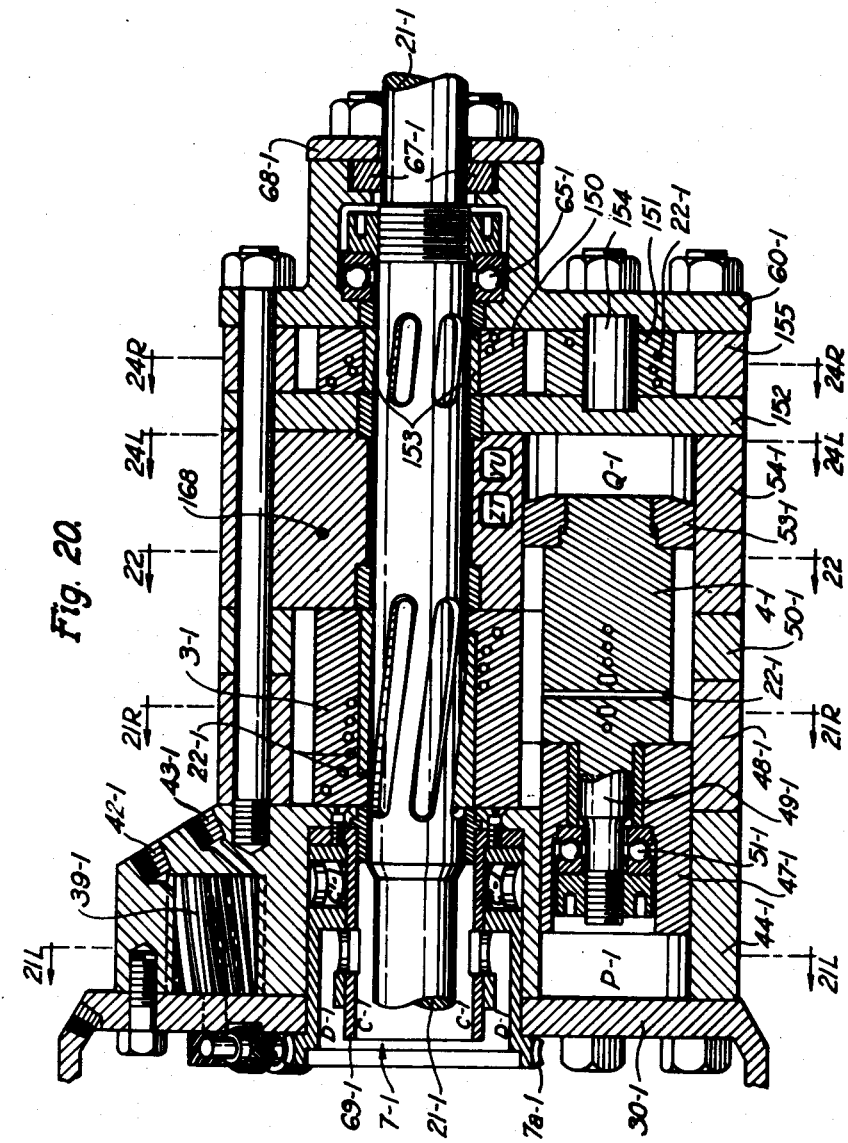

July 21, 1953 D. A. ELKINS 2,645,901
ROTARY PUMP AND MOTOR HYDRAULIC TRANSMISSION
Filed July 27, 1948 9 Sheets-Sheet 9
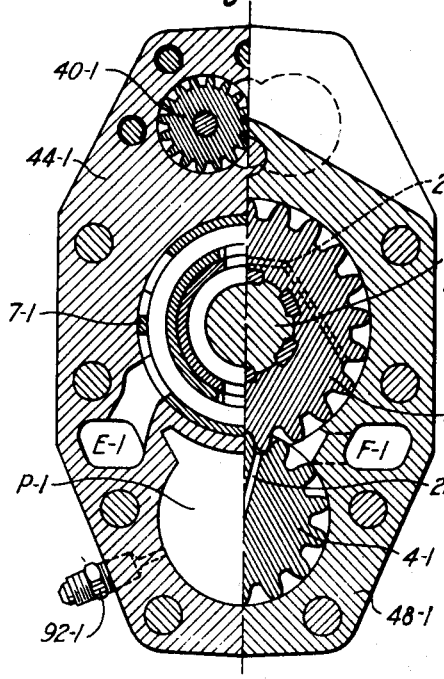
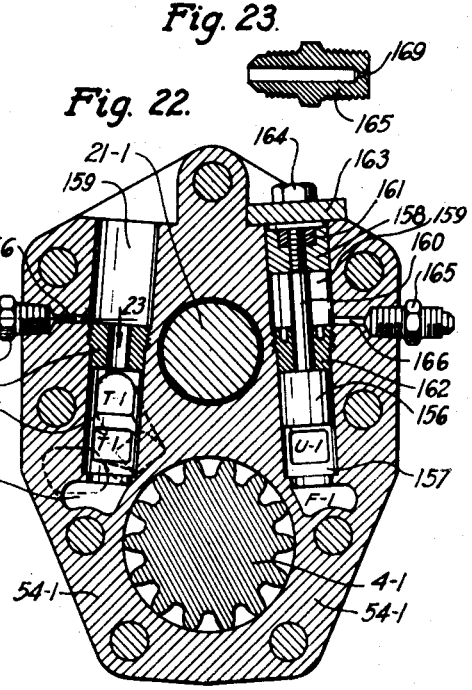
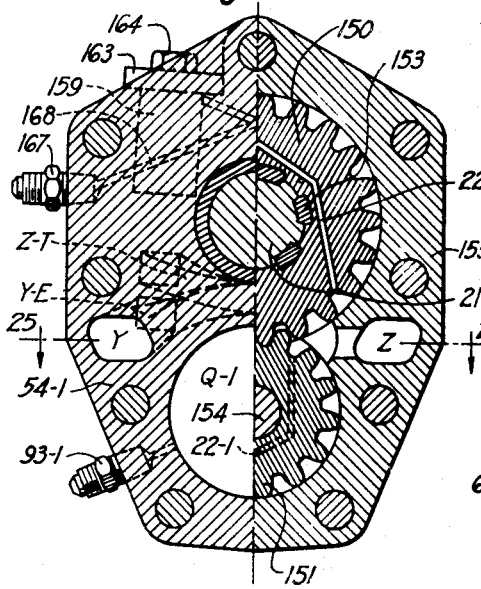
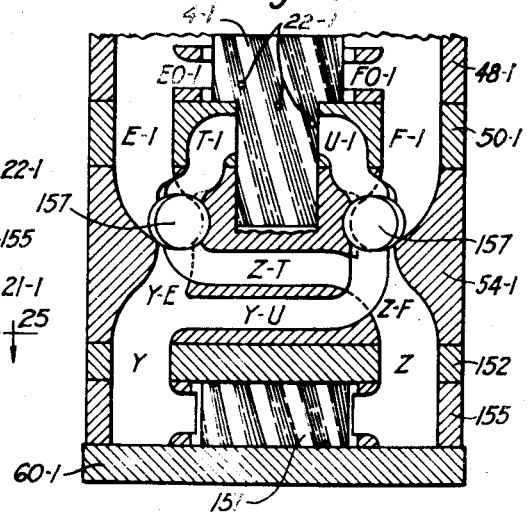
INVENTOR·
DOUGLAS A ELKINS,

Patented July 21, 1953

2,645,901

UNITED STATES PATENT OFFICE 2,645,901

ROTARY PUMP AND MOTOR HYDRAULIC TRANSMISSION

Douglas A. Elkins, Salt Lake City, Utah

Application July 27, 1948, Serial No. 40,847

19 Claims. (Cl. 60—53)

This invention relates to power transmissions, and particularly variable power transmissions of hydraulic type. It constitutes an improved form of the invention described and claimed in my previously filed copending application Serial No. 729,731, filed February 20, 1947, likewise entitled "Variable Ratio, Rotary Pump and Motor Hydraulic Transmission."

The prior application discloses certain forms of an infinitely variable power transmission having several sets of gears which act as fluid pumps and gear motors in the operation of the transmission, depending upon particular phases of the operation.

One set of gears is planetary, and serves to connect the power input components of the mechanism with the power output components thereof. It is enclosed by a substantially fluid-tight casing, which constitutes either a power input or a power output component as the case may be; and, in the operation of the transmission, it serves to transmit the rotation of the power input components to the power output components in either direct drive relationship (in which case the casing and gears rotate as a rigid unit), reduced drive relationship, overdrive relationship, or reverse drive relationship, as determined by either the limitations of the particular construction involved or by the setting of a novel fluid-flow control valve which is supplied in the more versatile constructions there specifically illustrated.

Another set of gears is of variable mesh type, and is arranged to be controlled, during the operation of the transmission in any of the different drive relationships, for the purpose of varying the pumping capacity of said set of gears, and, therefore, the drive ratio of the transmission as a whole, with infinite ratio variation over a range within the design limits of the device.

A third set of gears serves as timing means to constantly keep the components of the device in adjustment. In one form of that transmission this third set of gears is adapted to take over the maximum capacity of the variable mesh gear set either as a gear motor or fluid pump during the operation of the transmission, enabling such variable mesh gear set to repeat its performance from minimum to maximum and thereby affording additional range for the device.

The several sets of gears are connected by an arrangement of fluid-flow passages and auxiliary control valves, which correlate the same into an integrated operative whole. Especially outstanding in such infinitely variable transmission are the provisions made to prevent fluid leakage by lacing past the exposed ends of the teeth of the variable capacity gear set when said gear set is not operating at full capacity. This leakage is prevented by using gears with helical teeth of a novel tooth outline so formed that a line of contact between meshing teeth progresses substantially without interruption around the profile of said tooth as various phases of intermesh are presented on the meshing helix. In this way, if sufficient length of the gears are in mesh to provide a certain minimum angle of advance along the meshing helix, a complete line of seal is formed which controls the flow of fluid axially along the tooth spaces of the meshing teeth.

The use of helical teeth to accomplish this purpose is made possible by the use of flanged or winged pistons in connection with the respective axially movable gears of the variable capacity gear sets. These flanges serve to extend the arcuate surface of that piston which makes sliding contact with the tooth tips of the unmeshed portion of the axially fixed gear of said variable capacity gear set, with the result that the helical tooth spaces of the unmeshed portion of said gear cannot provide channels for leakage of fluid between the ports of said gear set across said arcuate surface. These flanges, by progressively sealing off the ports of the variable capacity gear set as they cover the unmeshed portion of the axially fixed gear, also serve to provide a complete seal when the variable mesh gear is entirely out of mesh, at which time there would be a maximum tendency for leakage by lacing past the exposed tooth ends. However, there is a range of operation extending between the point where the variable mesh gears are out of mesh and the point where they are sufficiently in mesh to provide a complete seal line along the helical teeth, in which axial leakage between the teeth is only partially prevented.

In accordance with the present invention, the variable mesh gears are arranged to operate at zero net capacity as a fluid motive means while still sufficiently in mesh to provide an effective fluid seal, thereby avoiding the above-mentioned range of intermesh where axial leakage is only partially prevented. Furthermore, the construction of the invention eliminates the need for separate timing means, since the variable mesh gears never move out of mesh beyond a constant zone of minimum intermesh. In addition, the normally ineffective capacity of such variable mesh gears as a fluid motive means, represented by the constant minimum intermesh, may be brought into the system as a supplement to the normal variable capacity, under the control of suitable auxiliary valve means.

Thus, principal objects of the present invention are:

To provide for sufficient partial mesh of the variable mesh gears at zero net pumping capacity to accomplish effective sealing against leakage by lacing past the ends of the gear teeth.

To provide for the assumption, by the variable mesh gears, of both the timing function and a continuously effective fluid-sealing function.

To eliminate the set of gears which performs the timing function.

To utilize the normally ineffective capacity, represented by the extent of constant intermesh of the variable capacity gears, as a supplement to the normal variable fluid motive capacity of said gears, when desired.

To simplify the transmission as a whole and make it more compact, thereby rendering it capable of manufacture at lower cost.

Figure 2:
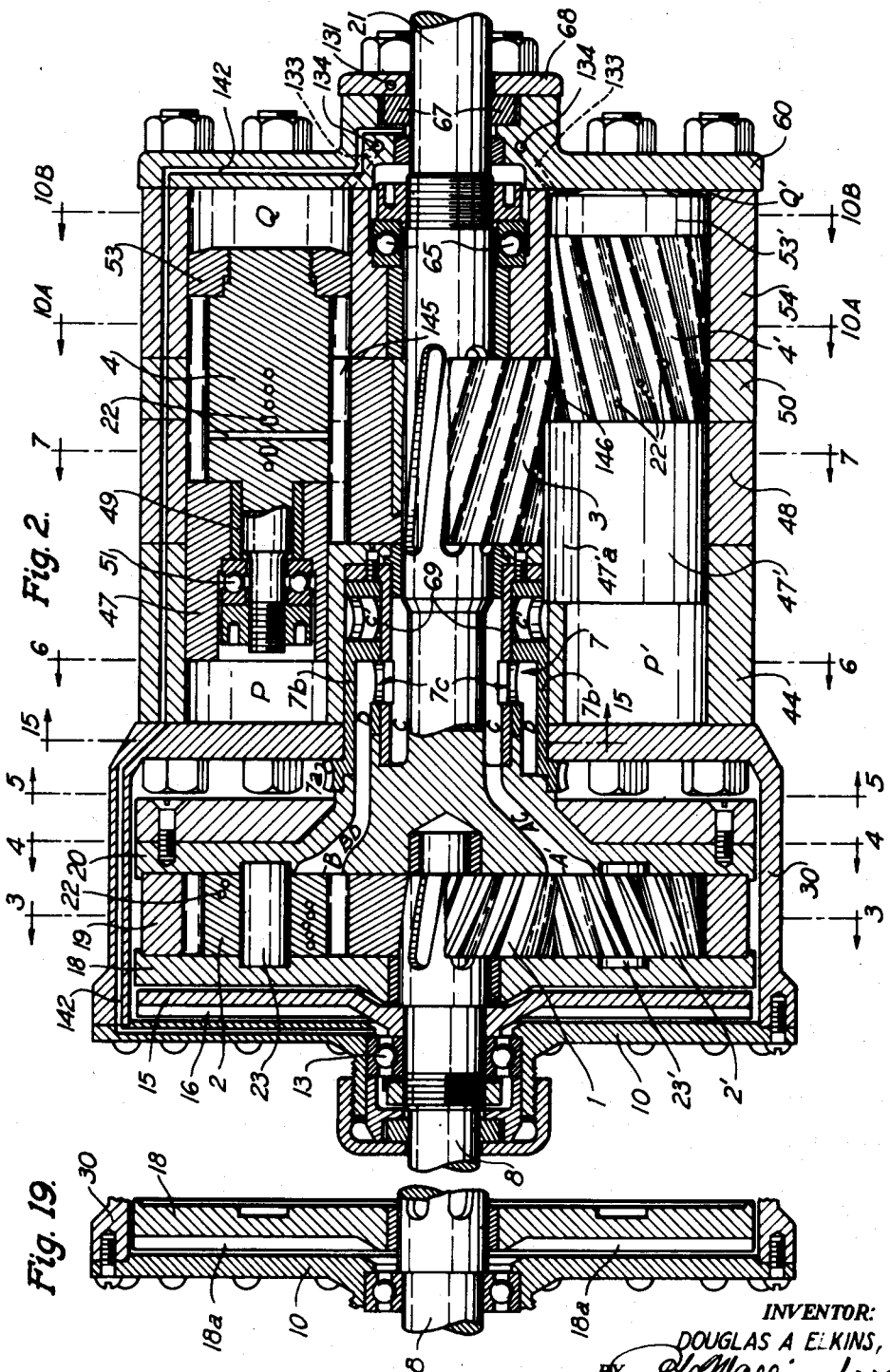
Figure 3:
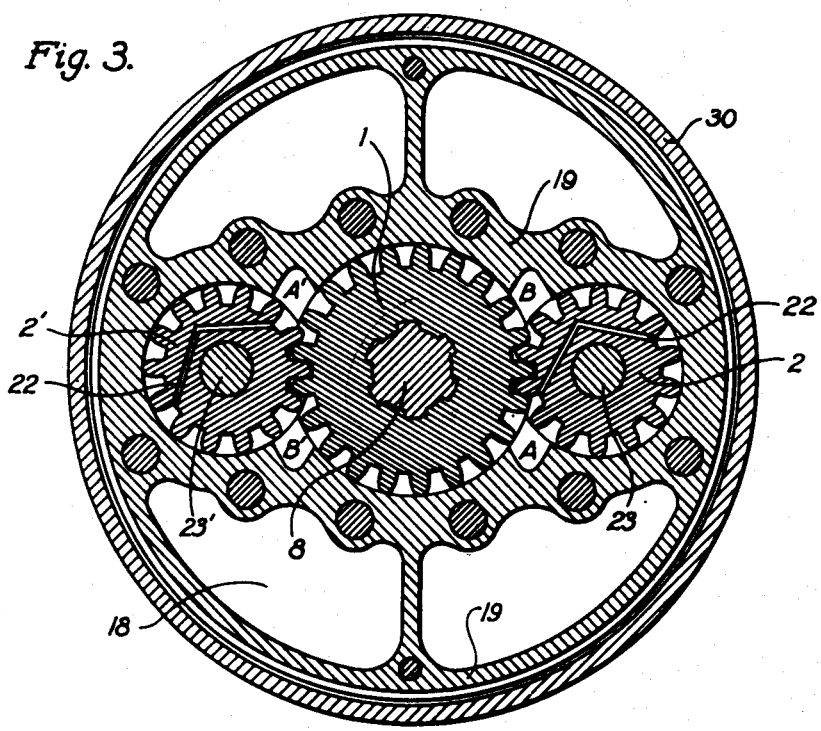
Figure 4:
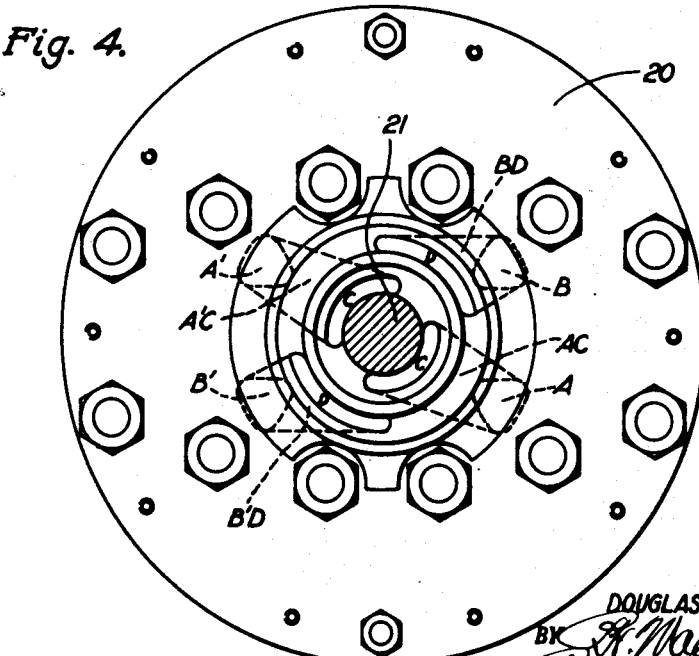
Figure 5:
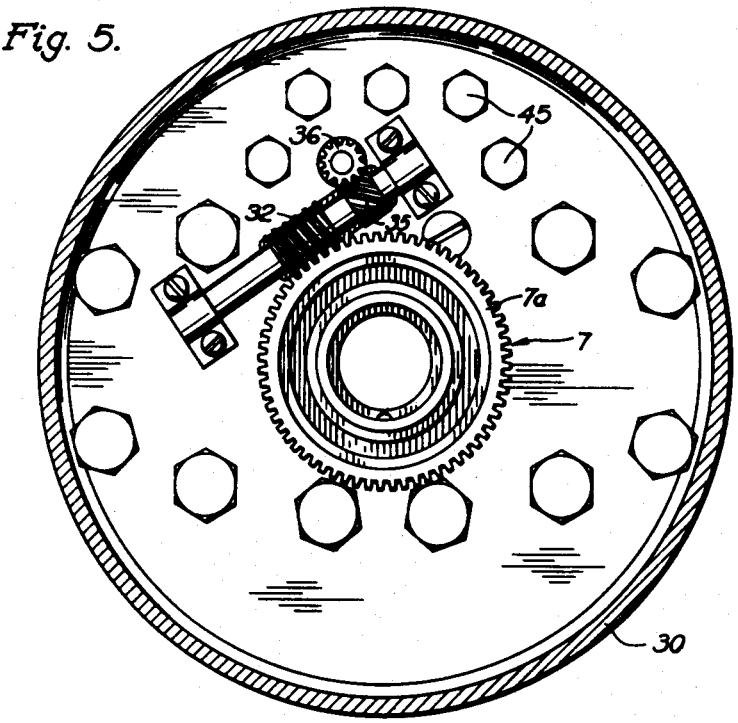
Figure 6:
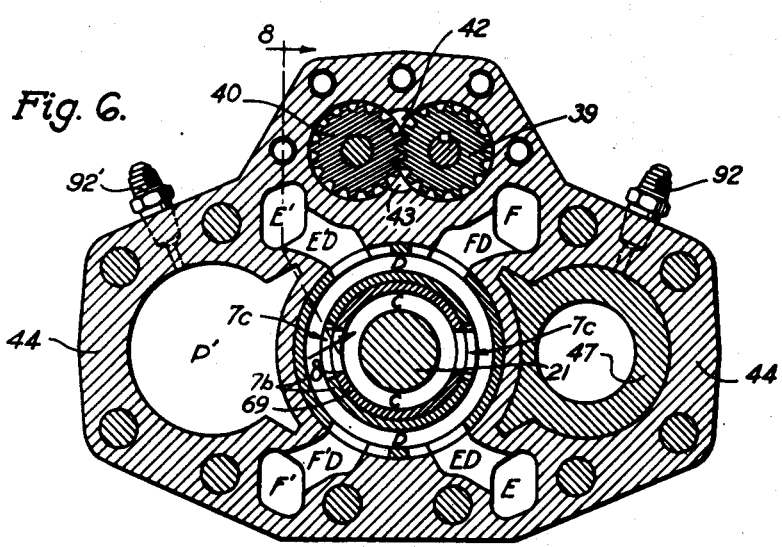
Figure 7:
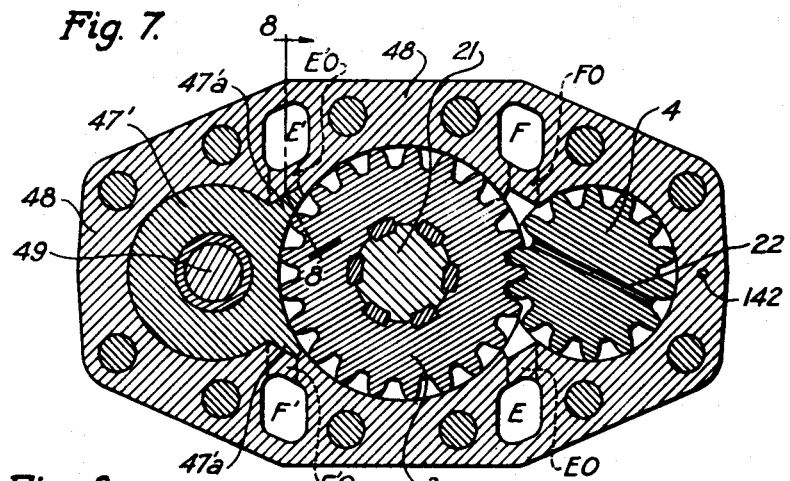
Figure 8:
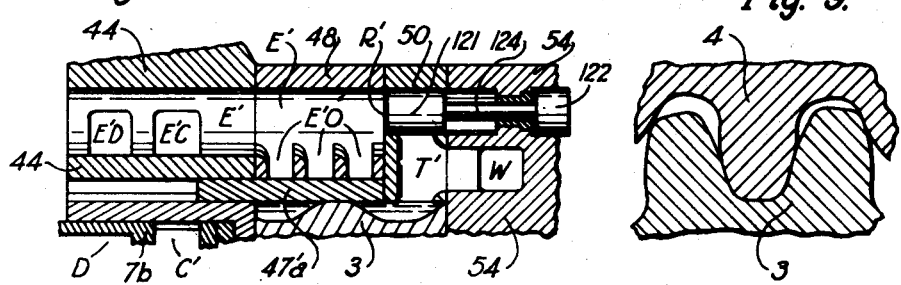
Figure 9:
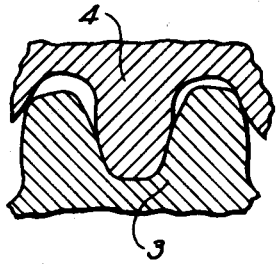
Figure 10:
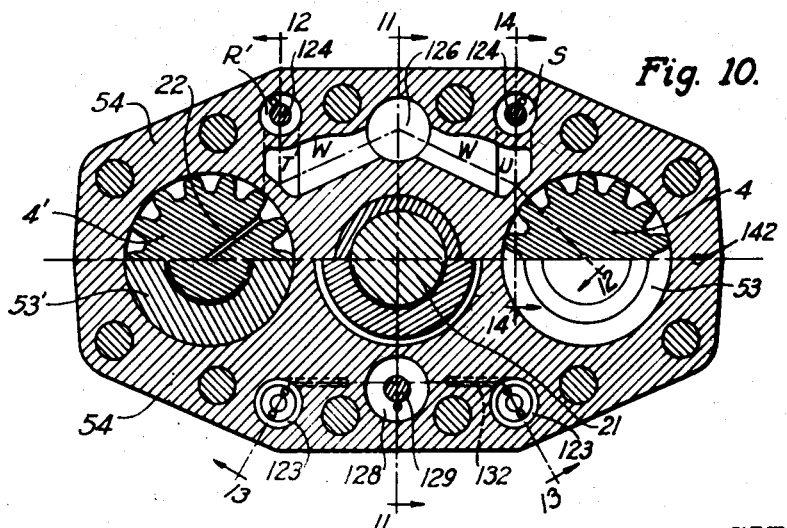
Figure 11:
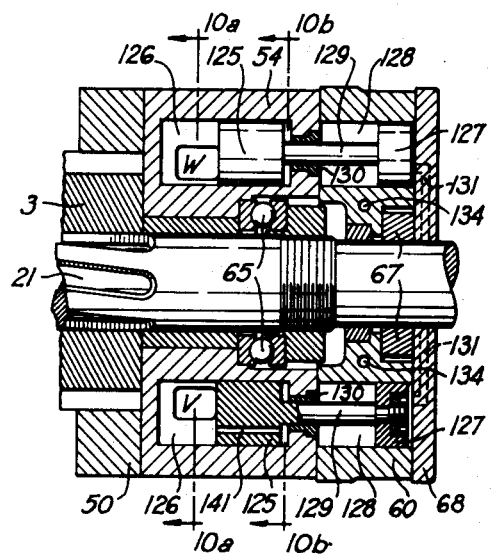
Figure 12:
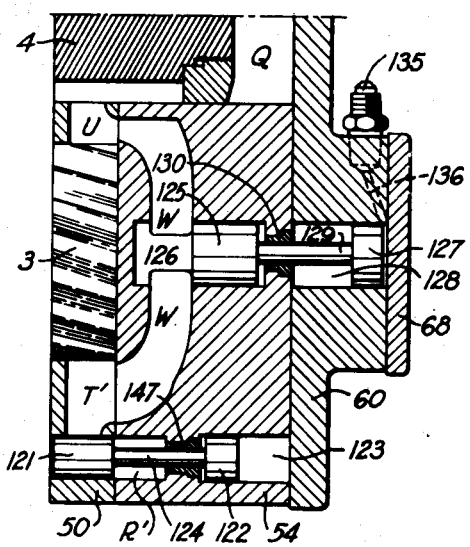
Figure 13:
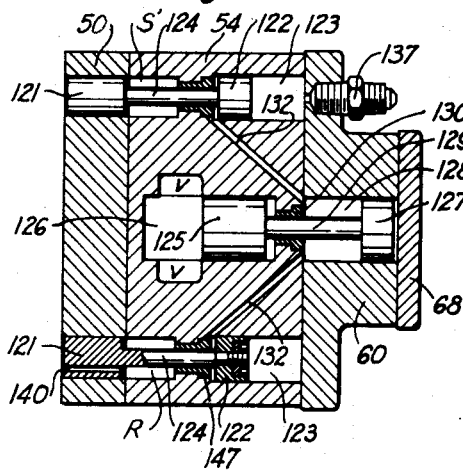
Figure 14:
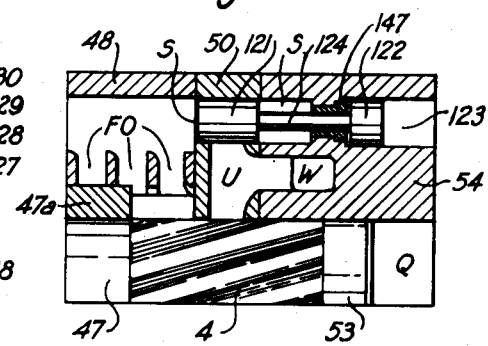

These and additional objects and features of the invention will be dealt with fully in the following detailed description of the preferred specific embodiment illustrated in the accompanying drawings, in which:

Fig. 1 represents a side elevation, partially in section, of an entire transmission constructed in accordance with the invention;

Fig. 1A, a fragmentary vertical section taken on the line 1A—1A of Fig. 1;

Fig. 2, a horizontal section taken on the line 2—2, Fig. 1, certain port holes having been arbitrarily moved to the section plane for purpose of illustration;

Fig. 3, a transverse vertical section taken along the line 3—3, Fig. 2;

Fig. 4, an elevation of the back or transition plate of the fluid-tight gear casing, the view being taken approximately on the line 4—4, Fig. 2;

Fig. 5, an elevation of the drive mechanism for the control valve as viewed from the line 5—5, Fig. 2, with the shaft and ported back or transition plate of the fluid-tight casing, as well as all forward mechanism, removed;

Fig. 6, a transverse vertical section taken along the line 6—6, Fig. 2, the control valve being shown in neutral setting;

Fig. 7, a transverse section taken along the line 7—7, Fig. 2;

Fig. 8, a fragmentary longitudinal section taken along the line 8—8, Figs. 6 and 7;

Fig. 9, an enlarged fragmentary section of meshing gear teeth of the intermeshed, variable mesh gears of Fig. 7;

Fig. 10, a transverse vetrical section taken partially on the line 10a—10a and partially on the line 10b—10b, Figs. 2 and 11, the upper half of the view representing the former and the lower half the latter;

Fig. 11, a fragmentary longitudinal section taken along the line 11—11, Fig. 10;

Fig. 12, a distorted and fragmentary horizontal section taken on the line 12—12, Fig. 10;

Fig. 13, a distorted and fragmentary horizontal section taken along the line 13—13, Fig. 10;

Fig. 14, a fragmentary longitudinal section taken along the line 14—14, Fig. 10;

Fig. 15, a fragmentary vertical section taken along the line 15—15, Fig. 2;

Fig. 16, a fragmentary longitudinal section through the control valve as taken along the line 16—16, Fig. 15;

Fig. 17, a fragmentary vertical section through the control valve as taken along the line 17—17, Fig. 16, the valve being in its neutral position.

Fig. 17A, a view similar to that of Fig. 17 except that the valve is in reverse or overdrive position;

Fig. 17B, a view similar to that of Fig. 17 except that the valve is in forward drive position;

Fig. 18, a fragmentary vertical section through the shift valve as taken along the line 18—18, Fig. 16, the valve being shown in its neutral position;

Fig. 18A, a view similar to that of Fig. 18 except that the valve is in reverse or overdrive position;

Fig. 18B, a view similar to that of Fig. 18 except that the valve is in forward drive position;

Fig. 19, a view corresponding to the left-hand portion of Fig. 2, illustrating an alternative construction of that portion;

Fig. 20, a longitudinal vertical section through the rear portion of an alternate construction of the transmission;

Fig. 21, a composite transverse vertical section, the left half of which is taken in the plane indicated by the line 21L—21L in Fig. 20, and the right half of which is taken along the line 21R—21R, Fig. 20;

Fig. 22, a transverse vertical section taken along line 22—22, Fig. 20;

Fig. 23, an enlarged section through a fluid connection, taken along line 23—23, Fig. 22;

Fig. 24, a composite transverse vertical section, the left half of which is taken in the plane indicated by the line 24L—24L in Fig. 20, and the right half of which is taken along the line 24R—24R, Fig. 20; and Fig. 25, a fragmentary horizontal section taken along the line 25—25, Fig. 24 showing fluid passageways (including those above the picture plane) in a manner to schematically illustrate the secondary fluid circulatory system.

Referring now to the drawings and to the particular construction illustrated, which is of the same versatile type as the constructions specifically set forth in my said prior application, that is to say a type embodying a main control valve settable to any one of the several possible drive relationships mentioned above:— many of the structural details of the presently illustrated construction and the constructions of the prior application are identical and are not here described at length. An attempt is made to use corresponding reference characters in instances where parts between the several constructions are identical or are provided to serve generally similar purposes.

As in the constructions of the prior application, see Figs. 2 and 3, a set of planetary gears, comprising a sun gear 1 and two planet gears 2 and 2', is enclosed by a fluid-tight casing made up of a front plate 18, an intermediate section 19, and a back plate 20, all rigidly secured together. This fluid-tight casing is itself positioned within the forward section 30 of an external transmission housing which is closed fluid-tight by a front cover plate 10.

The sun gear 1 is helically splined to a shaft 8 which extends through the front cover plate 10 into the forward section 30 of the transmission housing and through front plate 18 into the fluid-tight casing. Such shaft 8 is journaled in a radial-thrust bearing 13 suitably mounted in the front cover plate 10, and is also suitably journaled in the front plate 18 and the back plate 20 of the fluid-tight casing, as shown. It is here considered to be the power input shaft of the transmission, though in certain instances it may serve as the power output shaft.

A shaft 21, which is integral with or rigidly fixed to the back plate 20 of the fluid-tight casing, serves for the purposes of this discussion as the power output shaft of the transmission. The planet gears 2 and 2' are mounted to rotate freely on respective short shafts 23 and 23', which extend between and are fixed in the front and back plates 18 and 20 of the fluid-tight casing. Such casing is filled with a fluid medium, preferably a light grade lubricating oil, and when there is no exit therefore from the casing, the casing and the therein positioned planetary gears act as a rigid coupling between power input shaft 8 and power output shaft 21, serving to transmit rotation of the former to the latter in a direct one-to-one relationship.

To provide for drive of the power output shaft 21 by the power input shaft 8 at other than such direct one-to-one relationship and at a ratio which may be varied infinitely for any given drive relationship over a range established by the design of the transmission, a fluid-circulatory system is provided leading from said fluid-tight casing to mechanism positioned within other sections of the transmission housing and from such mechanism back to said fluid-tight casing.

In the illustrated versatile construction, a rotary control valve 7 serves as a control means governing fluid flow through the circulatory system. By its setting, coupled in certain instances with a proper auxiliary control of other parts of the transmission mechanism, is determined whether the transmission operates in direct drive, reduced drive, overdrive, or reverse drive relationship. In some instances of transmission use, only reduced drive or only overdrive and reverse drive is required for a particular installation. In such instances the illustrated construction may be simplified to reduce cost. The control valve 7 may be eliminated, and the fluid circulatory system designed to incorporate a particular arrangement of fluid-flow passages corresponding to the one desired setting of the control valve.

Included in the mechanism served by the fluid-circulatory system is a set of variable mesh gears whose variable fluid-pumping capacity and variable capacity as a gear motor provide the infinitely variable range of operation of the transmission. Such gear set here comprises, see Fig. 2, an axially fixed gear 3 and two oppositely disposed axially movable gears 4 and 4' meshing therewith. These gears are generally similar to the corresponding variable capacity gears of my aforesaid prior application, having helical gear teeth specially formed to provide lines of seal, when intermeshed, for preventing fluid flow axially thereof, but are somewhat more elongated to provide for a zone of constant intermesh. Like the said prior constructions, the fixed gear 3 is helically splined to an intermediate portion of the power output shaft 21, and the axially movable gears 4 and 4' are arranged in respective cylinders PQ and P'Q'—lying parallel to and at opposite sides of power output shaft 21—to slide backwardly and forwardly axially relative to fixed gear 3 for the purpose of varying the respective extents of intermesh. Unlike the said prior constructions, the axially movable gears 4 and 4' are free within their respective cylinders, that is to say, they are not loosely coupled to respective timing gears of a set of timing gears.

Pursuant to the present invention no such timing gears are employed. Instead, provision is made for respective zones of constant intermesh, indicated 145 between movable gear 4 and fixed gear 3, and indicated 146 between movable gear 4' and fixed gear 3. In addition to serving as timing means, these zones of constant intermesh 145 and 146 provide effective seals against fluid flow axially of the variable capacity gears at their respective positions of zero net capacity.

As illustrated, the axially movable gears 4 and 4' of the variable capacity set are substantially solid, as contrasted with the corresponding hollow gears of the aforesaid prior constructions, pressure balancing passages 22 being provided between respective pairs of diametrically opposite teeth thereof. As in the prior constructions, however, such gears are intimately associated with respective pistons 47 and 47', being secured thereto in abutting end-to-end relationship and relative rotation being provided for by respective elongated bearings, see 49, Fig. 2, and by respective thrust bearings, see 51, Fig. 2. Further, respective sealing collars 53 and 53' are secured to the opposite ends of such movable gears; control fluid may be introduced into either the respective cylinder portions Q and Q' or the respective cylinder portions P and P' through respective control connections, see 93, Fig. 1, or 92 and 92', Fig. 6, for the purpose of counteracting the effect of fluid from the fluid-circulating system of the transmission on the axially movable gears and for controlling the extents of meshing of such movable gears with the axially fixed gear 3 during operation of the transmission, thereby varying the drive ratio thereof.

The power output shaft 21 extends longitudinally through the transmission housing, projecting outwardly thereof through the rear cover plate 68. Between such rear cover plate and the forward housing section 30 are intermediate housing sections 44, 48, 50, 54 and 60, it being noted that the housing section 50 has no counterpart in the said prior constructions and that the present construction eliminates those housing sections of the prior constructions which are concerned particularly with the respective sets of timing gears of those constructions. Power output shaft 21 is axially positioned by the thrust bearing 65 mounted in housing section 54, and passes through a seal ring 67 which is held in place in housing section 60 by means of rear cover plate 68.

It is to be understood, of course, that the housing of the transmission, made up as it is of the several parts 10, 30, 44, 48, 50, 54, 60, and 68, does not rotate. It forms a stationary component of any installation of which the transmission is a part.

As in the prior constructions the fluid-circulatory system here runs longitudinally of the transmission, communicating with the interior of the fluid-tight casing through the back plate 20 thereof so that fluid may circulate from respective high pressure zones of the planetary gears 1, 2, and 2' within such casing to respective low pressure zones thereof, by way of other parts of the transmission mechanism. Thus, as illustrated in Figs. 3 and 4 especially, ports A and A' lead, by way of the respective passages AC and A'C, to the annular chamber C of a control valve 7 which is identical with the similarly identified control valve of the prior construction. Further, ports B and B' lead, by way of the respective passages BD and B'D, to the concentric annular chamber D of such control valve 7.

Control valve 7 comprises a tubular stationary part 69, see Fig. 2, and a double walled and compartmented concentric movable part 7b. It fits concentrically about and extends lengthwise with the power output shaft 21 immediately to the rear of the back plate 20 of the fluid-tight casing, making a close bearing fit with the latter. Annular chamber C is defined between the shaft 21 and the stationary valve part 69, while annular chamber D is defined between the double walls of movable valve part 7b forwardly of the walled-off annular compartment C', see especially Fig. 16. Ports in stationary valve part 69 cooperate with corresponding ports in movable valve part 7b at a certain setting of the valve, see 7c, Figs. 6 and 17, to permit free circulation of fluid between valve chambers C and D and, therefore, free circulation of fluid between the A ports and the B ports of the fluid-tight casing. This is the "neutral" setting of the control valve.

Considering the power input shaft 8 to be rotating in a counterclockwise direction, from the standpoint of Fig. 3, the ports A and A' are disposed in respective high pressure zones while the ports B and B' are disposed in relatively low pressure zones. This is so because the open tooth spaces of sun gear 1, between port B and port A' and between port B' and port A, carrying fluid during the said counterclockwise rotation of such sun gear, as do the open tooth spaces of planet gear 2 between port B and port A and the open tooth spaces of planet gear 2' between port B' and port A' during the respective concomitant clockwise rotations of such planet gears 2 and 2'. Accordingly, in the aforesaid neutral setting of the control valve 7, fluid will circulate freely from the respective A ports, through the intercommunicating valve chambers C and D, to the respective B ports, the circulatory circuit being completed within the fluid-tight casing wherein the planetary gears, acting collectively as a fluid pump by reason of the above-explained fluid-carrying capacity of the gear teeth, force circulation of the fluid. Because of the free circulation of fluid within the localized flow-circuit traced out above, rotation of power input shaft 8 will not effect rotation of power output shaft 21.

The fluid-circulatory system continues from control valve 7 through what is here regarded as the rear portion of the transmission, extending for the most part longitudinally along power output shaft 21 and communicating with the variable capacity gear set through ports referred to below.

As in the aforesaid prior constructions, longitudinal fluid-flow passages E, E', F, and F', see especially Figs. 6, 7, 8, and 16, afford, by way of respective feeder passages ED, E'D, FD, and F'D (note Fig. 16 and see also Figs. 17, 17A, and 17B) and respective feeder passages EC, E'C, FC, and F'C (Fig. 16 again and also Figs. 18, 18A, and 18B) selective communication of the valve chambers C, C', and D with the ports of the variable capacity gear set, here typified by the ports E'O, Fig. 8, and FO, Fig. 14. The selectivity of said communication between the various valve chambers and the various fluid-flow passages is determined by the disposition of the various valve ports in control valve 7, the selection being made in practice by rotation of such control valve to any one of several possible operative positions. Here, as in the prior constructions, rotation of the control valve is preferably accomplished by a gear motor 39, 40, Figs. 1 and 6, operably connected by spiral gears 35 and 36, Figs. 1 and 5, to a worm drive comprising a worm 32 meshing with a toothed flange 7a of the movable valve part 7b. The gear motor is driven by fluid supplied through ports 42 and 43, Fig. 1, from suitable means under control of the operator.

The longitudinal fluid-flow passages E, E', F, and F' originate in section 44 of the transmission housing, and extend completely through section 48 thereof. In section 50 of the housing they gave way, without interruption, to respective cylindrical extensions R, R', S, and S' of reduced cross-section, see Figs. 8, 10, 12, 13, and 14.

It should be noted that the series of ports leading to the variable capacity gear set terminate at the forward wall face of housing section 50, see Figs. 8 and 14; also, that such forward wall face of housing section 50 marks the limit of rearward travel of the pistons 47 and 47' and their respective port-closing wing extensions 47a and 47'a, see Fig. 2. Accordingly, when both the axially movable gears 4 and 4' are positioned as far out of mesh with axially fixed gear 3 as is possible, bringing pistons 47 and 47' to such rearward limit positions, the aforesaid ports are completely closed off by the wing extensions of such pistons.

As illustrated in Fig. 2, the respective zones of constant intermesh 145 and 146 between axially fixed gear 3 and axially movable gears 4 and 4' are disposed within housing section 50. The cylindrical fluid-flow passage extensions R, R', S, and S' lead, under valve control, to such zones of constant intermesh of the variable capacity gear set by way of respective transversely extending fluid-flow passages T, T', U, and U', see Figs. 8, 10, 12, and 14. The fluid-flow passages T and U' are interconnected by a valved fluid-flow passage V, Fig. 13, and the fluid-flow passages T' and U by a similarly valved fluid-flow passage W, Figs. 10 and 12, so that, when the valves are open, there may be free flow between the T and U' passsages and also between the T' and U passages.

The fluid-flow passage extensions R, R', S, and S' are in effect nothing more than valve cylinders, within which slide respective valve plungers 121, see especially Figs. 8, 13, and 14, for the purpose of controlling fluid flow between the longitudinally extending fluid-flow passages E, E', F, and F', and the respective transversely extending fluid-flow passages T, T', U, and U'. The valve plungers 121 are operated by respective pistons 122 slidably disposed within corresponding control cylinders 123, the plunger and piston of each pair being fixed at opposite ends of a connecting rod 124 which extends through the partition dividing the particular fluid-flow passage extension concerned from its corresponding control cylinder 123 and slides in a substantially fluid-tight bushing 147 there provided.

The fluid-flow passages V and W which interconnect the fluid-flow passages T and U' and the fluid-flow passages U and T', respectively, are valved substantially centrally of their lengths by respective valve plungers 125 slidable within respective valve cylinders 126. Such valve cylinders intersect and cut transversely across the respective passages V and W, see Figs. 11, 12, and 13. The valve plungers 125 are operated by respective pistons 127 slidably disposed within corresponding control cylinders 128, a valve plunger 125 and a piston 127 being rigidly interconnected by a connecting rod 129 slidable in a substantially fluid-tight bushing 130.

So that the several valve plungers 121 which govern the flow between fluid-flow passages E, E', F, and F' and fluid-flow passages T, T', U, and U', respectively, will be forced to operate under centralized hydraulic control simultaneously with the pair of valve plungers 125 which respectively govern flow between fluid-flow passage T and U' and between fluid-flow passages T' and U, the total operating displacement of the four pistons 122 in the cylinders 123 is made to equal the sum of the operating displacements of the pistons 127 in the cylinders 128, and the cylinders 123 are so interconnected with the cylinders 128 by fluid-flow passages that fluid displaced by the operation of one of these sets of pistons serves as operating media to cause simultaneous operation of the other set of pistons. Thus, the rearward portions of the two control cylinders 128 are interconnected by a passage 131, Fig. 11. The forward portion of each is connected with the forward portions of the respectively adjacent pair of control cylinders 123 by passages 132, see Fig. 13. The rearward portions of the several control cylinders 123 are interconnected by respective feeder passages 133, Fig. 2, leading into a common annular passage 134. Centralized hydraulic control is attained by the provision of a hydraulic control connection 135, Fig. 12, leading into the rearward portion of one of the control cylinders 128 by means of a short passage 136, and by the provision of a similar hydraulic control connection 137, Fig. 13, opening into the rearward portion of one of the several control cylinders 123.

In the control of the transmission, introducing fluid under pressure through hydraulic control connection 135 and coincidentally allowing fluid to discharge through hydraulic control connection 137 will force the pistons 127 forwardly within their respective control cylinders 128, thereby causing one of the valve plungers 125 to close communication between the T and U' ports and the other to close communication between the U and T' parts. Fluid will be displaced from the forward portions of the control cylinders 128 through passages 132 into the forward portions of the several control cylinders 123, thereby forcing the pistons 122 rearwardly to cause the valve plungers 121 to open communication between the fluid-flow passages E, E', F, and F', and the respective fluid-flow passages T, T', U, and U'. The fluid displaced by the rearward travel of pistons 122 within their respective control cylinders 123 will be discharged through hydraulic control connections 137, the fluid from three of such control cylinders 123 passing into the fourth, and so out the connection 137, by way of the feeder passages 133 and common annular passage 134. Introduction of fluid through hydraulic control connection 137 and coincident discharge from connection 135 will effect the reverse action, causing valve plungers 121 to close communication between the fluid-flow passages E, E', F, F', and the respective fluid-flow passages T, T', U, and U', and the valve plungers 125 to open communication between the T and U' ports on one hand and the U and T' ports on the other.

The valve plungers are illustrated in these latter positions throughout the several views. Under such conditions and when both of the pistons 47 and 47' are in their rearward limit positions, as the piston 47' is shown to be in Fig. 2, the variable mesh gears 3, 4, and 4' are in their positions of minimum intermesh and have zero net pumping capacity. The aforesaid ports leading directly from the longitudinally extending fluid-flow passage E, E', F, and F' to the variable capacity gear set are completely closed by the wing extension 47a and 47'a of the pistons 47 and 47', and the fluid-flow passages R, R', S, and S' are closed by the respective valve plungers 121, thereby cutting off communication between the passages E, E', F, and F' and the respective passages T, T', U, and U'. Fluid pumped by those portions of the variable capacity gears 3, 4, and 4' included within the zones of constant intermesh 145 and 146 will flow freely between the several T and U ports by way of fluid-flow passages V and W, open as they are by reason of the respective valve plungers being retracted. No work will be done by such fluid-flow, since the two axially movable gears 4 and 4' have identical pumping capacities and equal minimum mesh.

In the operation of the transmission, the variable capacity gears provide infinitely variable pumping capacity from the above-described zero net to a given maximum. Pumping capacity is progressively increased from said zero net value by progressively forcing the axially movable gear 4 into effective mesh with the axially fixed gear 3. This is accomplished in the present construction as in the prior, by progressively introducing control fluid into the cylinder portion Q through the hydraulic control connection 93, Figs. 1 and 1A, while at the same time permitting discharge of fluid from the cylinder portion P through the hydraulic control connection 92, see Fig. 6.

Assuming the shaft 8 to be rotating in a counterclockwise direction, from the standpoint of Fig. 3, there will be a tendency for fluid pressure to build up in the A and A' ports above that in the B and B' ports. Since the ports A and A' connect through respective passageways AC and A'C to the annular chamber C of the valve 7, see Fig. 4, and since the ports B and B' connect through passageways BD and B'D to the annular chamber D of such control valve 7, the fluid pressure in the chamber C will exceed that in the chamber D.

If the control valve 7 is assumed to be set for speed reduction, see Figs. 17B and 18B, fluid pressure from the chamber C will communicate, through the passageway F and whatever part of the ports FO are opened by the forward movement of the piston 47, to the port area of the variable capacity gears 3 and 4, see Fig. 14, and thence to the U passage by way of the tooth spaces of such gears. In like manner, the lower fluid pressure from the D chamber will communicate with the opposing port of the variable capacity gears 3 and 4. These unbalanced pressures acting on the ports of the variable capacity gears will set up a counterclockwise moment on the gear 3 proportional to the length of the meshing face of the gears 3 and 4.

From the U passage and through the open passage W, see Figs. 10 and 12, high pressure fluid from the F passage will enter the passage T', see Fig. 8, which serves as a port to the variable capacity gears 3 and 4'. In similar fashion the opposing port of the gears 3 and 4' will communicate, through the passage V, with low pressure fluid from the E passageway. These unbalanced pressures acting on the gears 3 and 4' will impose a clockwise moment on the gear 3 proportional to the length of their meshing face.

Since the gear 4 is farther in mesh with the gear 3 than is the gear 4', the resultant moment acting on the gear 3 will be a counterclockwise moment proportional to the difference in lengths of these meshing faces. This moment will supplement the counterclockwise moment imposed on the output shaft 21 by the input shaft 8 through the gear set 1, 2, and 2', and the shaft 21 will rotate in a counterclockwise direction. The gear 4, in combination with the gear 3, will act as a gear motor, while the gear 4', in combination with gear 3, will act as a gear pump to supply the fluid necessary to drive, as a gear motor, that portion of gear 4' (constant or minimum mesh) enclosed in the housing section 50.

The net capacity of such variable capacity or control gears acting through the E and F channels to determine the transmission ratio will be the capacity of that portion of the gears 3 and 4 which is in mesh within housing section 48, see Fig. 2.

After axially movable gear 4 has progressively increased capacity up to full mesh with axially fixed gear 3, the next step in increasing capacity is to bring the constant mesh portions of both gear 4 and gear 4' into action as gear motors driving the power output shaft counterclockwise. This is accomplished by introducing high pressure fluid through hydraulic control connection 135 into the rear portion of the particular control cylinder 128 concerned, and by allowing discharge of fluid from the rear portion of the particular control cylinder 123 concerned, through hydraulic control connection 137, thereby causing valve plungers 125 to close the respective passages V and W and valve plungers 121 to open the respective fluid-flow passage extensions R, R', S, and S' enabling fluid to flow from passages E, E', F, and F' through respective transverse passages T, T', U, and U' into the tooth spaces of those portions of the variable mesh gears constituting the constant mesh zones 145 and 146.

The large increase in capacity occasioned by the above-described action will be more than the controls are demanding, and, as such capacity is introduced, it should be compensated for by a concomitant reducing of the extent of mesh of gear 4 with gear 3 by introduction of fluid into the P cylinder chamber and withdrawal of fluid from the Q cylinder chamber.

In the construction illustrated, one-third of each axially movable gear 4 and 4' is constantly in mesh with the axially fixed gear 3, that is to say, the zones of constant intermesh 145 and 146 defined by housing section 50 are each equivalent in length to one-third the length of an axially movable gear 4 or 4'. The gear 4 will therefore have to decrease its capacity by two-thirds in order to maintain constant capacity during the above-described transition brought about by reversing the setting of the valve plungers 121 and 125. Accordingly, it will have to be returned to its position of minimum or constant mesh with the gear 3.

The actual length of the zones of constant or minimum intermesh 145 and 146 should be great enough to insure that, in all phases of the meshing cycle, the advance on the tooth helix in said zones will provide sufficient variation in phase of intermesh on any meshing tooth that a substantially complete line of seal will be formed between meshing teeth to control the flow of fluid axially along the tooth spaces. It is not necessary that this length constitute one-third of the length of the gear face, however, for a smooth transition can be maintained in instances where the zone of constant intermesh is less than one-third of the gear length by withdrawing the gear 4 only partially.

Following the introduction into the operating system of the fixed or constant capacity of the variable mesh gears, the effective capacity may be further gradually increased by first progressively forcing gear 4 again into mesh with gear 3 within housing section 48, this being accomplished, as before, by introducing fluid into cylinder chamber Q through hydraulic control connection 93, while allowing fluid to discharge from cylinder chamber P through hydraulic control connection 92, and thereafter, by similarly progressively forcing gear 4' into mesh with gear 3 within housing section 48.

Overdrive and reverse drive relationships are established by suitable setting of the control valve 7, accompanied by appropriate hydraulic control, all as set forth fully in my aforesaid prior filed and copending application Serial No. 729,731, the drive ratio in each being varied in accordance with the control principles explained above.

With the planetary and variable capacity gears proportioned as illustrated the transmission will provide a direct drive, a speed reduction ranging from zero to 13:4, an overdrive ranging from zero theoretically to infinity, and a reverse ranging from a 5:4 reduction to a theoretical infinite overdrive. It will also provide four set speeds forward by using for the first, high pressure fluid to give zero control capacity; for the second, total variable capacity of gear 4' meshing with gear 3, for the third, set capacity plus gear 4' in complete mesh with gear 3, and for the fourth, set capacity plus gears 4 and 4' in complete mesh with gear 3.

The present construction not only completely eliminates timing gears, but possesses the added advantage that the variable capacity gears always operate with enough of their tooth faces in mesh to provide a near perfect hydraulic seal on the engaging seal-line teeth. Such teeth are the same special type described in my aforementioned prior application. They are here illustrated in detail in Fig. 9.

Considering, now, certain additional aspects of the fluid circulatory and control system, the valve plungers 121 and 125 are not affected by any leakage of fluid which may occur backwardly therearound from the forward portions of their respective valve cylinders. As illustrated in Figs. 11 and 13 such valve plungers have passages 140 and 141, respectively, extending longitudinally therethrough to balance pressures and facilitate operation. Through these passages fluid pressures may build up to cause a gradual leakage past the associated substantially fluid-sealing bushings 147 and 130 into the forward portions of the respective control cylinders 123 and 128. However, it can be seen that, wherever there is a positive pressure tending to leak past a bushing into the front portion of a control cylinder, that control cylinder intercommunicates with another control cylinder where there is low pressure ahead of the bushing. Accordingly fluid from the former will pass to the latter, and the pressure maintained forwardly of the control pistons 122 and of the control pistons 127 will always be an intermediate pressure which will hold back those pistons subjected to low pressure at their rearward faces, while allowing those pistons subjected to high pressure at their rearward faces to remain forward.

As in the prior construction, an impeller 15 having blades 16, Figs. 1 and 2, is advantageously fixed on the power input shaft 8 forwardly of the fluid-tight casing within housing section 30, for the purpose of building up fluid pressures which may be tapped and utilized in the hydraulic control of the transmission.

For preventing the building up of fluid pressure at the rear seal ring 67 and thereby reducing to a minimum any tendency for fluid to leak out around power output shaft 21, the space ahead of such rear seal ring is connected by a fluid-flow passage 142 to the relatively low-pressure space in housing section 30 disposed near the center and forwardly of the impeller 15.

In instances where the hydraulic control is required to be a function of the speed of rotation of the shaft 21 instead of the shaft 8, the impeller for producing fluid pressure within the housing section 30 may be formed by fins 18a projecting from the outer face of the forward wall section 18 of the fluid-tight casing, see Fig. 19.

In the foregoing I have disclosed the invention as embodied in a highly versatile transmission mechanism. Nevertheless certain aspects of the invention, which here constitute subcombinations of the larger combination, may be employed in a variety of ways known to those skilled in the art. For instance, the novel variable capacity gear set is capable of use in fluid pumps and gear motors generally. Furthermore, other arrangements and types of valves known to the art may be used in place of the novel centralized hydraulic control arrangement here utilized in connection with such variable capacity gear set.

Since the present invention involves, broadly, the maintaining of sufficient gear face in mesh at zero net capacity of the variable capacity gear set to provide an effective seal against leakage by lacing past the exposed ends of meshing teeth, there are other constructions which will satisfy the broad inventive concepts. For example, the construction illustrated in Figs. 20 to 25 accomplishes the same purpose by balancing the minimum capacity of the variable mesh gears against the capacity of an auxiliary fixed capacity gear set.

This alternate form of the transmission is composed largely of parts similar or identical to those of the previously described construction and since the function of these parts is also very similar to that of the previously described counterparts, the mechanism of this construction will not be described in detail. To facilitate identification of similar parts, the same numbers used in the previous construction are used here with a suffix –1 added.

The forward part of the transmission, that is to say, that part surrounding the input shaft 8 and contained in the casing 30, see Fig. 2, is the same in this construction as in the previously described construction. For this reason, only that portion behind the rear wall of the casing 30-1 is illustrated in Fig. 20.

Only one axially movable gear 4-1 is used in the particular construction illustrated and, to make for better balance in the design, the gear motor 39-1, 40-1 is placed diametrically opposite said axially movable gear 4-1, see Figs. 20 and 21.

The valve 7-1 is exactly the same as in the previous construction, except that it opens into only one set of fluid passageways E-1 and F-1, see Fig. 21.

Since in this construction the gear 3-1 is not inherently balanced by an opposed port arrangement, said gear is provided with holes 22-1 connecting substantially diametrically opposed tooth spaces to assure effective hydraulic balance.

In this construction, a fixed capacity fluid motive means consisting of meshing gears 150 and 151 are provided to offset the minimum capacity of the variable mesh gear set. The gears 150 and 151 are separated from the variable capacity gears by the housing section 152, see Fig. 20. The gear 150 is helically keyed to the shaft 21-1 by the keys 153. The gear 151 rotates on the shaft 154 which is supported in housing sections 152 and 60-1 as shown in Fig. 20. Housing section 155 completes the enclosure of the gears 150 and 151, see Figs. 20 and 24.

Section 54-1 of the transmission housing differs considerably from the corresponding section 54 of the previous construction. The thrust bearing 65-1 is placed in housing section 60-1, see Fig. 20, to make room for a system of valves and fluid passageways in housing section 54-1. These valves are shown in Fig. 22. The left valve cylinders are shown empty to illustrate the port locations. The valve pistons are shown in place in the cylinders on the right. The valve pistons 156, slidably disposed in the cylinders 157 into which the various ports open, are operated by the pistons 158 slidable within the cylinders 159. Said pistons 156 and 158 are connected by the rods 160 which are here conveniently illustrated as integral parts of the pistons 156 and as being secured to the pistons 158 by nuts 161. The rods slide through the bushings 162 which separate the cylinders 157 and 159. These bushings 162 are threaded into housing section 54-1.

The cylinders 159 are closed at their outer ends by the cover plates 163 which are secured by screws 164, see Fig. 22.

Two connections to the T-1 and U-1 passageways from the ports of the fixed minimum mesh section of the gears 3-1 and 4-1 open into the forward side of each of the cylinders 157, see Fig. 22. The lower ends of the cylinders 157 connect with the respective fluid passageways E-1 and F-1, which communicate with the valve 7-1 and the variable mesh portion of the gears 3-1 and 4-1.

The ports opening into the rear side of the valve cylinders 157 can be seen in Figs. 24 and 25. The lower ports connect with the respective fluid passageways YE and ZF, which communicate with the ports Y and Z respectively of the fixed capacity gears 150 and 151. The upper ports connect to the respective fluid passageways ZT and YU, which cross as shown in Fig. 25 to communicate with the ports Z and Y, respectively, of said fixed capacity gears 150 and 151.

The pistons 158 are operated hydraulically through the control connections 165, see Fig. 22, which communicate with the extreme lower ends of the cylinders 159 by way of the fluid passageways 166, and through the control connection 167, see Fig. 24, which communicates with the extreme outer ends of both of the cylinders 159 by way of the fluid passageway 168.

In the operation of the transmission, when high pressure fluid is admitted to the fluid connections 165 and fluid is allowed to discharge from the fluid connection 167, the pistons 158 will move the pistons 156 to the upper limit of their travel as indicated in Fig. 22. With the valve pistons 156 in this position, the lower portions of the valve cylinders 157 provide communication between the fluid passageways E-1, T-1, and YE (or Y) and between fluid passageways F-1, U-1, and ZF (or Z).

Since the passageways E-1, T-1, and Y connect with similarly disposed ports of the variable mesh portion of the gears 3-1 and 4-1, the constant minimum mesh portion of said gears 3-1 and 4-1, and the fixed capacity gears 150 and 151, respectively, and since the fluid passageways F-1, U-1, and Z connect with the various respective opposite ports, when the valve pistons 156 are in this position the fluid capacities of the entire meshing face of the gears 3-1 and 4-1 and the fixed fluid capacity of the gears 150 and 151 will combine as a fluid motive means, communicating with the valve 1-1 through the fluid passageways E-1 and F-1.

When high pressure fluid is introduced into the fluid connection 167 and fluid is allowed to discharge through the connections 165, the pistons 158 force the valve pistons 156 to the lower limit of their travel. In this position, the lower ends of the pistons 156 seal off the outlets to the respective fluid passageways E-1 and F-1, while the upper portions of the cylinders 157 provide communication between the fluid passageways T-1 and ZT (or Z) and between fluid passageways U-1 and YU (or Y). Through these communicating passageways, the ports of the constant mesh zone of the variable mesh gears 3-1 and 4-1 are connected to respective oppositely disposed ports of the fixed capacity gears 150 and 151, and the equivalent capacities of these two fluid motive means will balance or offset each other as did the two constant minimum mesh zones of the variable mesh gears of the previous transmission construction. In other words, when the variable mesh gears 3-1 and 4-1 are operating as a fluid motor, the fixed capacity gears 150 and 151 will function as a fluid pump to supply the fluid necessary to drive the constant minimum mesh portion of said variable mesh gears as a motor, and, when the variable mesh gears are operating as a fluid pump, the gears 150 and 151 will function as a fluid motor, utilizing the fluid supplied by the constant minimum mesh portion of said variable mesh gears. The quantity of fluid flowing in the passageways E-1 and F-1 will be governed only by the extent of intermesh in the variable mesh zone of the gears 3-1 and 4-1.

To progressively increase the fluid capacity of the variable capacity unit, the gear 4-1 is first moved increasingly into mesh with the gear 3-1 while the pistons 156 are in their bottom position. Here, as in the previous construction, this action is accomplished hydraulically by introduction of fluid into the chamber Q-1, see Fig. 20, through fluid connection 93-1, see Fig. 24, and allowing fluid to discharge from the opposing chamber P-1 through fluid connection 92-1, see Fig. 21.

When the variable mesh gears 3-1 and 4-1 are completely in mesh, their effective fluid capacity may be replaced (entirely or in part depending upon design dimensions) by the combined fluid capacity of the fixed capacity gears 150 and 151 and the minimum mesh zone of the variable mesh gears. This is accomplished by forcing the valve pistons 156 to their uppermost positions and simultaneously withdrawing the variable mesh gears 3-1 and 4-1 far enough out of mesh to compensate for the fluid capacity this action introduces. The effective capacity can then be gradually increased to a maximum by progressively returning said variable mesh gears to full mesh.

To insure that there will be no interruption of fluid flow during the operation of the piston valves 156, it is essential that some provision be made to insure that the two pistons are moved simultaneously by the action of the pistons 158. There are several ways in which this may be accomplished, for example, by coupling the two piston assembles either mechanically or hydraulically. Another method, which is illustrated here, consists simply of providing each of the fluid connections 165 with a small orifice 169, see Fig. 23. By throttling the fluid flowing either into or out of the lower ends of the cylinders 159, these orifices 169 make the net operating pressure acting on either of the pistons 158 an inverse function of the rate of movement of that piston. In this way, any tendency for one of these pistons 158 to lag behind the other will be immediately offset by an increased operating force on the lagging piston.

So that there will be no appreciable unbalanced end pressures on the pistons 156, the upper T-1 or U-1 connections to the cylinders 157 extend to the upper end of said cylinders, see Fig. 22. The upper surfaces of the pistons 156 are therefore always subjected to the pressure of fluid from the passageways T-1 or U-1. The lower surface of said pistons are subjected to fluid pressures from the E-1 or F-1 passageways through the bottom of the cylinders 157, see Fig. 22. Since there will always be free communication between the T-1 and E-1 and U-1 and F-1 fluid passageways, either through the tooth spaces of the gears 3-1 and 4-1 or through the lower portions of the valve cylinders 157, whenever the valve pistons are operated, this arrangement insures a balance of end pressures.

It will be noted that, in the first alternate construction of the present invention, the auxiliary valve mechanism consists of two separate sets of cooperating valves, and, further, that although provision is made to synchronize the action of the valves of each individual set, no mention is made of any provision for synchronizing the operation of the two sets. The throttling arrangement described here for the valve pistons 158, may also be applied to the two valves pistons 127 to insure simultaneous operation.

Whereas this invention is here illustrated and described with respect to certain preferred embodiments thereof it should be realized that various changes may be made therein, and various other embodiments may be constructed on the basis of the teachings hereof by those skilled in the art without departing from the inventive concepts defined by the following claims.

I claim:

1. A fluid translating device of variable capacity, comprising a fluid-tight housing defining fluid-pressure chambers therein; a set of two variably intermeshed gears disposed within said housing, said gears having seal-line helical teeth providing for the progressive establishment of a line of contact around the profiles of intermeshing teeth to control the flow of fluid axially through the tooth spaces of intermeshing teeth and to substantially prevent fluid leakage by lacing past the exposed ends of said teeth; means rotatably mounting one of said gears in axially fixed position within a fluid-pressure chamber of said housing, providing an outside power connecto high pressure at their rearward faces to remain forward.

As in the prior construction, an impeller 15 having blades 16, Figs. 1 and 2, is advantageously fixed on the power input shaft 8 forwardly of the fluid-tight casing within housing section 30, for the purpose of building up fluid pressures which may be tapped and utilized in the hydraulic control of the transmission.

For preventing the building up of fluid pressure at the rear seal ring 67 and thereby reducing to a minimum any tendency for fluid to leak out around power output shaft 21, the space ahead of such rear seal ring is connected by a fluid-flow passage 142 to the relatively low-pressure space in housing section 30 disposed near the center and forwardly of the impeller 15.

In instances where the hydraulic control is required to be a function of the speed of rotation of the shaft 21 instead of the shaft 8, the impeller for producing fluid pressure within the housing section 30 may be formed by fins 18a projecting from the outer face of the forward wall section 18 of the fluid-tight casing, see Fig. 19.

In the foregoing I have disclosed the invention as embodied in a highly versatile transmission mechanism. Nevertheless certain aspects of the invention, which here constitute subcombinations of the larger combination, may be employed in a variety of ways known to those skilled in the art. For instance, the novel variable capacity gear set is capable of use in fluid pumps and gear motors generally. Furthermore, other arrangements and types of valves known to the art may be used in place of the novel centralized hydraulic control arrangement here utilized in connection with such variable capacity gear set.

Since the present invention involves, broadly, the maintaining of sufficient gear face in mesh at zero net capacity of the variable capacity gear set to provide an effective seal against leakage by lacing past the exposed ends of meshing teeth, there are other constructions which will satisfy the broad inventive concepts. For example, the construction illustrated in Figs. 20 to 25 accomplishes the same purpose by balancing the minimum capacity of the variable mesh gears against the capacity of an auxiliary fixed capacity gear set.

This alternate form of the transmission is composed largely of parts similar or identical to those of the previously described construction and since the function of these parts is also very similar to that of the previously described counterparts, the mechanism of this construction will not be described in detail. To facilitate identification of similar parts, the same numbers used in the previous construction are used here with a suffix –1 added.

The forward part of the transmission, that is to say, that part surrounding the input shaft 8 and contained in the casing 30, see Fig. 2, is the same in this construction as in the previously described construction. For this reason, only that portion behind the rear wall of the casing 30-1 is illustrated in Fig. 20.

Only one axially movable gear 4-1 is used in the particular construction illustrated and, to make for better balance in the design, the gear motor 39-1, 40-1 is placed diametrically opposite said axially movable gear 4-1, see Figs. 20 and 21.

The valve 7-1 is exactly the same as in the previous construction, except that it opens into only one set of fluid passageways E-1 and F-1, see Fig. 21.

Since in this construction the gear 3-1 is not inherently balanced by an opposed port arrangement, said gear is provided with holes 22-1 connecting substantially diametrically opposed tooth spaces to assure effective hydraulic balance.

In this construction, a fixed capacity fluid motive means consisting of meshing gears 150 and 151 are provided to offset the minimum capacity of the variable mesh gear set. The gears 150 and 151 are separated from the variable capacity gears by the housing section 152, see Fig. 20. The gear 150 is helically keyed to the shaft 21-1 by the keys 153. The gear 151 rotates on the shaft 154 which is supported in housing sections 152 and 60-1 as shown in Fig. 20. Housing section 155 completes the enclosure of the gears 150 and 151, see Figs. 20 and 24.

Section 54-1 of the transmission housing differs considerably from the corresponding section 54 of the previous construction. The thrust bearing 65-1 is placed in housing section 60-1, see Fig. 20, to make room for a system of valves and fluid passageways in housing section 54-1. These valves are shown in Fig. 22. The left valve cylinders are shown empty to illustrate the port locations. The valve pistons are shown in place in the cylinders on the right. The valve pistons 156, slidably disposed in the cylinders 157 into which the various ports open, are operated by the pistons 158 slidable within the cylinders 159. Said pistons 156 and 158 are connected by the rods 160 which are here conveniently illustrated as integral parts of the pistons 156 and as being secured to the pistons 158 by nuts 161. The rods slide through the bushings 162 which separate the cylinders 157 and 159. These bushings 162 are threaded into housing section 54-1.

The cylinders 159 are closed at their outer ends by the cover plates 163 which are secured by screws 164, see Fig. 22.

Two connections to the T-1 and U-1 passageways from the ports of the fixed minimum mesh section of the gears 3-1 and 4-1 open into the forward side of each of the cylinders 157, see Fig. 22. The lower ends of the cylinders 157 connect with the respective fluid passageways E-1 and F-1, which communicate with the valve 7-1 and the variable mesh portion of the gears 3-1 and 4-1.

The ports opening into the rear side of the valve cylinders 157 can be seen in Figs. 24 and 25. The lower ports connect with the respective fluid passageways YE and ZF, which communicate with the ports Y and Z respectively of the fixed capacity gears 150 and 151. The upper ports connect to the respective fluid passageways ZT and YU, which cross as shown in Fig. 25 to communicate with the ports Z and Y, respectively, of said fixed capacity gears 150 and 151.

The pistons 158 are operated hydraulically through the control connections 165, see Fig. 22, which communicate with the extreme lower ends of the cylinders 159 by way of the fluid passageways 166, and through the control connection 167, see Fig. 24, which communicates with the extreme outer ends of both of the cylinders 159 by way of the fluid passageway 168.

In the operation of the transmission, when high pressure fluid is admitted to the fluid connections 165 and fluid is allowed to discharge from the fluid connection 167, the pistons 158 will move the pistons 156 to the upper limit of their travel as indicated in Fig. 22. With the valve pistons 156 in this position, the lower portions of the valve cylinders 157 provide communication between the fluid passageways E–1, T–1, and YE (or Y) and between fluid passageways F–1, U–1, and ZF (or Z).

Since the passageways E–1, T–1, and Y connect with similarly disposed ports of the variable mesh portion of the gears 3–1 and 4–1, the constant minimum mesh portion of said gears 3–1 and 4–1, and the fixed capacity gears 150 and 151, respectively, and since the fluid passageways F–1, U–1, and Z connect with the various respective opposite ports, when the valve pistons 156 are in this position the fluid capacities of the entire meshing face of the gears 3–1 and 4–1 and the fixed fluid capacity of the gears 150 and 151 will combine as a fluid motive means, communicating with the valve 7–1 through the fluid passageways E–1 and F–1.

When high pressure fluid is introduced into the fluid connection 167 and fluid is allowed to discharge through the connections 165, the pistons 158 force the valve pistons 156 to the lower limit of their travel. In this position, the lower ends of the pistons 156 seal off the outlets to the respective fluid passageways E–1 and F–1, while the upper portions of the cylinders 157 provide communication between the fluid passageways T–1 and ZT (or Z) and between fluid passageways U–1 and YU (or Y). Through these communicating passageways, the ports of the constant mesh zone of the variable mesh gears 3–1 and 4–1 are connected to respective oppositely disposed ports of the fixed capacity gears 150 and 151, and the equivalent capacities of these two fluid motive means will balance or offset each other as did the two constant minimum mesh zones of the variable mesh gears of the previous transmission construction. In other words, when the variable mesh gears 3–1 and 4–1 are operating as a fluid motor, the fixed capacity gears 150 and 151 will function as a fluid pump to supply the fluid necessary to drive the constant minimum mesh portion of said variable mesh gears as a motor, and, when the variable mesh gears are operating as a fluid pump, the gears 150 and 151 will function as a fluid motor, utilizing the fluid supplied by the constant minimum mesh portion of said variable mesh gears. The quantity of fluid flowing in the passageways E–1 and F–1 will be governed only by the extent of intermesh in the variable mesh zone of the gears 3–1 and 4–1.

To progressively increase the fluid capacity of the variable capacity unit, the gear 4–1 is first moved increasingly into mesh with the gear 3–1 while the pistons 156 are in their bottom position. Here, as in the previous construction, this action is accomplished hydraulically by introduction of fluid into the chamber Q–1, see Fig. 20, through fluid connection 93–1, see Fig. 24, and allowing fluid to discharge from the opposing chamber P–1 through fluid connection 92–1, see Fig. 21.

When the variable mesh gears 3–1 and 4–1 are completely in mesh, their effective fluid capacity may be replaced (entirely or in part depending upon design dimensions) by the combined fluid capacity of the fixed capacity gears 150 and 151 and the minimum mesh zone of the variable mesh gears. This is accomplished by forcing the valve pistons 156 to their uppermost positions and simultaneously withdrawing the variable mesh gears 3–1 and 4–1 far enough out of mesh to compensate for the fluid capacity this action introduces. The effective capacity can then be gradually increased to a maximum by progressively returning said variable mesh gears to full mesh.

To insure that there will be no interruption of fluid flow during the operation of the piston valves 156, it is essential that some provision be made to insure that the two pistons are moved simultaneously by the action of the pistons 158. There are several ways in which this may be accomplished, for example, by coupling the two piston assembles either mechanically or hydraulically. Another method, which is illustrated here, consists simply of providing each of the fluid connections 165 with a small orifice 169, see Fig. 23. By throttling the fluid flowing either into or out of the lower ends of the cylinders 159, these orifices 169 make the net operating pressure acting on either of the pistons 158 an inverse function of the rate of movement of that piston. In this way, any tendency for one of these pistons 158 to lag behind the other will be immediately offset by an increased operating force on the lagging piston.

So that there will be no appreciable unbalanced end pressures on the pistons 156, the upper T–1 or U–1 connections to the cylinders 157 extend to the upper end of said cylinders, see Fig. 22. The upper surfaces of the pistons 156 are therefore always subjected to the pressure of fluid from the passageways T–1 or U–1. The lower surface of said pistons are subjected to fluid pressures from the E–1 or F–1 passageways through the bottom of the cylinders 157, see Fig. 22. Since there will always be free communication between the T–1 and E–1 and U–1 and F–1 fluid passageways, either through the tooth spaces of the gears 3–1 and 4–1 or through the lower portions of the valve cylinders 157, whenever the valve pistons are operated, this arrangement insures a balance of end pressures.

It will be noted that, in the first alternate construction of the present invention, the auxiliary valve mechanism consists of two separate sets of cooperating valves, and, further, that although provision is made to synchronize the action of the valves of each individual set, no mention is made of any provision for synchronizing the operation of the two sets. The throttling arrangement described here for the valve pistons 158, may also be applied to the two valves pistons 127 to insure simultaneous operation.

Whtereas this invention is here illustrated and described with respect to certain preferred embodiments thereof it should be realized that various changes may be made therein, and various other embodiments may be constructed on the basis of the teachings hereof by those skilled in the art without departing from the inventive concepts defined by the following claims.

I claim:

1. A fluid translating device of variable capacity, comprising a fluid-tight housing defining fluid-pressure chambers therein; a set of two variably intermeshed gears disposed within said housing, said gears having seal-line helical teeth providing for the progressive establishment of a line of contact around the profiles of intermeshing teeth to control the flow of fluid axially through the tooth spaces of intermeshing teeth and to substantially prevent fluid leakage by lacing past the exposed ends of said teeth; means rotatably mounting one of said gears in axially fixed position within a fluid-pressure chamber of said housing, providing an outside power connection for the device; a closed-ended cylinder paralleling and opening into said gear, the other of said gears being fitted within said cylinder in intermeshing relationship with the first gear and for back and forth movement along said cylinder into lesser or greater intermesh with said first gear; piston-like sealing members secured to the second gear at opposite ends thereof; abutment stops limiting back and forth movement of said second gear to establish a zone of constant minimum intermesh and a zone of variale intermesh for said gears, said zone of minimum intermesh having an axial length sufficient to maintain a substantially complete and continuous seal-line between the intermeshing teeth, and that piston-like member which is disposed at that end of said second gear which follows in the out-of-mesh movement being arcuately recessed to contact the tooth tips of the non-meshing portion of the said first gear, and being rotatably secured to said second gear; fluid translating gear means rotatably mounted in another of said fluid-pressure chambers of said housing in common drive association with the said first gear and having a capacity substantially equal to that of said zone of minimum intermesh; a fluid circulatory system having fluid inlet and fluid discharge ports, ports opening into respective opposite sides of said set of variable mesh gears within said zone of minimum intermesh and said zone of variable intermesh, and ports opening into respective opposite sides of said fluid translating gear means, said system including fluid flow passageways connecting opposed ports of said zone of minimum intermesh in parallel with respective opposed ports of said fluid translating gear means, and fluid flow passageways cross-connecting said opposed ports of said zone of minimum intermesh with respective opposed ports of said fluid translating gear means; shut-off valves disposed in each of said passageways; and means for operating the respective valves.

2. The combination recited in claim 1, wherein said arcuately recessed piston-like member is provided with wing members bordering the arcuate recess and extending the arcuate surface thereof beyond the points of intersection of the addendum circles of said first and second variable mesh gears, for the purpose of preventing fluid leakage across said surface through the helical tooth spaces of the non-meshing portion of the said first gear.

3. The combination recited in claim 2, wherein the ports of the fluid circulatory system which open into the zones of variable gear intermesh are disposed along the path of movement of said wing members, so that said wing members serve as valves to close said ports when the said second gear is not meshing within its zone of variable gear-intermesh, and to open said ports as said second gear is forced into mesh within its said zone of variable gear-intermesh.

4. The combination recited in claim 3, wherein the said ports emanate from respective longitudinal flow-passages of said circulatory system which lead into a secondary portion of said circulatory system; wherein said fluid translating gear means is disposed in said secondary portion; and wherein the shut-off valves include valves disposed to control passage between said longitudinal flow-passages and said secondary portion of the fluid circulatory system, said secondary portion including the cross-connecting fluid flow passageways.

5. The combination recited in claim 4, wherein the shut-off valves include additional oppositely acting valves disposed within the secondary portion of the fluid circulatory system, said valves being disposed to close off free circulation within said secondary portion of the fluid circulatory system.

6. The combination recited in claim 5, wherein the secondary portion of the fluid circulatory system opens into the intermeshed gears within the zone of constant minimum intermesh from portions of said system disposed between those valves which control entry to said secondary portion of the system and those valves which control circulation within said secondary portion of the system.

7. The combination recited in claim 6, wherein both the valves controlling entrance to the secondary portion of the fluid circulatory system and the valves controlling circulation within said secondary portion of the system are fluid-activated; wherein the actuating means therefor intercommunicate; and wherein oppositely connected fluid-delivery means alternate between fluid supply and fluid discharge as the case may require for effecting actuation of said valves in common.

8. The combination recited in claim 1, wherein the said device is encased within a transmission housing having fixed capacity fluid motive means positioned within a substantially fluid-tight section thereof; wherein two power shafts are connected together by said fixed capacity fluid motive means, serving as a coupling device; wherein the said first gear of the variable capacity fluid translating device is fixed to one of said power shafts; wherein fluid impeller means is disposed within said housing section, and is connected for rotation with the other of said power shafts; wherein the said one power shaft emerges from said transmission housing at a location remote from said housing section and is provided with fluid-sealing means thereat; and wherein fluid-flow passage means directly connects the fluid-pressure zone disposed immediately adjacent said fluid-sealing means with the zone of minimum fluid-pressure disposed adjacent the rotative center of said fluid impeller means.

9. The combination recited in claim 8, wherein there are provided means for tapping pressure fluid from within the fluid-tight section of the transmission housing, and means for introducing pressure fluid to the said cylinder of the fluid translating device for the purpose of varying the extent of intermesh of said variable-intermesh gears.

10. A fluid motive device of variable capacity, comprising intermeshing gears establishing at least two zones of constant mesh and one or more zones of variable mesh; fluid-flow passage means serving all of said zones in common by parallel connections; auxiliary fluid-flow passage means cross-connecting said zones of constant mesh; valve means controlling fluid-flow from said first passage means into said zones of constant mesh; and valve means controlling fluid-flow through said auxiliary passage means, whereby the device is capable of zero net capacity when said first valve means are closed and said second valve means are open, the zones of constant mesh being thereby rendered affective to offset one another.

11. A fluid translating device of variable capacity, comprising a fluid-tight housing defining fluid-pressure chambers therein; a set of at least three variably intermeshed gears disposed within said housing, said gears having seal-line helical teeth providing for the progressive establishment of a line of contact around the profiles of intermeshing teeth to control the flow of fluid axially through the tooth spaces of intermeshing teeth and to substantially prevent fluid leakage by lacing past the exposed ends of said teeth; means rotatably mounting one of said gears in fixed position within a fluid-pressure chamber of said housing, providing an outside power connection for the device; at least two closed-ended cylinders paralleling and opening into said one gear, the other gears of said set of gears being respectively fitted within said cylinders in intermeshing relationship with the said one gear and for back and forth movement along their respective cylinders into lesser or greater intermesh with said one gear; piston-like sealing members respectively secured to said other gears at opposite ends thereof; respective abutment stops limiting back and forth movement of said other gears to establish respective zones of constant minimum intermesh and respective zones of variable intermesh for said gears, said zones of minimum intermesh having respective axial lengths sufficient to maintain a substantially complete and continuous seal-line between the intermeshing teeth thereof, and those piston-like members which are disposed at those ends of said other gears which follow in the out-of-mesh movement being arcuately recessed to contact the tooth tips of the non-meshing portions of the said one gear, and being rotatably secured to their respective other gears; and a fluid-circulatory system, said system comprising fluid-inlet and fluid-discharge ports, sets of oppositely disposed ports opening into the respective zones of variable intermesh, fluid-flow passage ways interconnecting one set of functionally corresponding ports of the said sets of ports with one of said inlet and discharge ports, and other fluid-flow passageways interconnecting the remaining set of functionally corresponding ports of said sets of ports with the other of said inlet and discharge ports, further sets of oppositely disposed ports opening into the respective zones of constant minimum intermesh, fluid-flow passageways interconnecting one set of functionally corresponding ports of said further sets of ports in parallel with the first-named set of corresponding ports of said first-named sets of ports, other fluid-flow passageways interconnecting the remaining set of functionally corresponding ports of said further sets of ports in parallel with the second-named set of corresponding ports of the said first-named sets of ports, fluid-flow passageways cross-connecting those ports of said further sets of ports which are functionally opposite as between the several said further sets of ports, respective shut-off valves interposed in said parallel-connecting fluid-flow passageways, other respective shut-off valves interposed in said cross-connecting fluid-flow passageways, means for operating the first-named valves, and means for operating the second-named valves.

12. The combination recited in claim 11, wherein said arcuately recessed piston-like members are each provided with wing members bordering the arcuate recess and extending the arcuate surface thereof beyond the points of intersection of the addendum circles of the variable-intermesh gears, for the purpose of preventing fluid leakage across said surface and through the helical tooth spaces of the non-meshing portion of the said one gear.

13. The combination recited in claim 12, wherein those ports of the fluid-circulatory system which open into the zones of variable gear intermesh are disposed along the paths of movement of said wing members, so that said wing members serve as valves to close said ports when the said other gears are not meshing within the said zones of variable gear-intermesh, and to open said ports as said other gears are forced into mesh within the said zones of variable gear-intermesh.

14. The combination recited in claim 11, wherein the said device is encased within a transmission housing having fixed capacity fluid motive means positioned within a substantially fluid-tight section thereof; wherein two power shafts are connected together by said fixed capacity fluid motive means, serving as a coupling device; wherein the said one gear of the variable capacity fluid translating device is fixed to one of said power shafts; wherein fluid impeller means is disposed within said housing section, and is connected for rotation with the other of said power shafts; wherein the said one power shaft emerges from said transmission housing at a location remote from said housing section and is provided with fluid-sealing means thereat; and wherein fluid-flow passage means directly connects the fluid-pressure zone disposed immediately adjacent said fluid-sealing means with the zone of minimum fluid-pressure disposed adjacent the rotative center of said fluid impeller means.

15. The combination recited in claim 14, wherein there are provided means for tapping pressure fluid from within the fluid-tight section of the transmission housing, and means for introducing pressure fluid to the said cylinders of the said fluid translating device for the purpose of varying the extent of intermesh of said variable intermesh gears.

16. A fluid motive device of variable capacity, comprising a fluid-tight housing; at least two intermeshed fluid motive gears disposed within said housing and arranged for relative axial movement to vary the extent of intermesh, said gears having helical teeth formed with rounded tips and filled roots and with substantially no tip or back running clearance, so that the spaces between teeth closely fit the outline generated in transit by the meshing teeth in passing through their meshing cycle and thereby provide a line of contact progressing around the profiles of intermeshing teeth to control the flow of fluid axially through the tooth spaces of said intermeshing teeth and to substantially prevent fluid leakage by lacing past the exposed ends of said teeth means for limiting said axial movement of said intermeshed gears in the out-of-mesh direction to an extent establishing a zone of constant minimum intermesh of length sufficient to maintain a substantially complete seal line between intermeshing teeth; and means for effecting relative axial movement of said fluid motive gears, for varying the extent of said gear intermesh outside said zone of constant minimum intermesh.

17. A fluid translating device of variable capacity, comprising a fluid-tight housing defining fluid-pressure chambers therein; a set of two variably intermeshed gears disposed within said housing, said gears having seal-line helical teeth providing for the progressive establishment of a line of contact around the profiles of intermeshing teeth to control the flow of fluid axially through the tooth spaces of intermeshing teeth and to substantially prevent fluid leakage by lacing past the exposed ends of said teeth; means rotatably mounting one of said gears in fixed position within a fluid-pressure chamber of said housing, providing an outside power connection for the device; means mounting the other of said gears in axially movable, intermeshing relationship with the first gear; means for moving the second gear into greater or lesser intermeshing relationship with the first gear; means limiting the extent of axial movement of the second gear, to provide a zone of constant minimum intermesh and a zone of variable intermesh for said gears, said zone of minimum intermesh having an axial length sufficient to maintain a substantially complete and continuous seal-line between the intermeshing teeth; a concavely arcuate sealing element associated with the second gear as a follower in the out-of-mesh direction and movable back and forth therewith, so as to contact the tooth tips of that portion of the first gear which is not in meshing engagement; fluid translating gear means rotatably mounted in another of said fluid-pressure chambers of said housing, in common drive association with said first gear and having a capacity substantially equal to that of said zone of minimum intermesh; a fluid circulatory system having fluid inlet and fluid discharge ports, ports opening into respective opposite sides of said set of variable mesh gears within said zone of minimum intermesh and said zone of variable intermesh, and ports opening into respective opposite sides of said fluid translating gear means, said system including fluid flow passageways connecting opposed ports of said zone of minimum intermesh in parallel with respective opposed ports of said fluid translating gear means, and fluid flow passageways cross-connecting said opposed ports of said zone of minimum intermesh with respective opposed ports of said fluid translating gear means; shut-off valves disposed in each of said passageways; and means for operating the respective valves.

18. The combination recited in claim 17, wherein the fluid translating gear means comprises a third gear mounted within the first-mentioned fluid-pressure chamber, in variable intermeshing relationship with said fixed first gear at the side thereof opposite said axially movable second gear, and in a manner similar to the latter.

19. The combination recited in claim 17, wherein the fluid translating gear means comprises a set of fixed capacity fluid translating gears disposed in a secondary portion of said fluid circulatory system which defines said cross-connecting fluid flow passageways.

DOUGLAS A. ELKINS.

References Cited in the file of this patent

UNITED STATES PATENTS

| Number | Name | Date |
|---|---|---|
| 711,662 | Herdman | Oct. 21, 1902 |
| 815,522 | Fraser | Mar. 20, 1906 |
| 1,080,282 | Kellogg | Dec. 2, 1913 |
| 1,223,734 | Rinehart | Apr. 24, 1917 |
| 1,243,640 | Story | Oct. 16, 1917 |
| 1,647,621 | Hawley | Nov. 1, 1927 |
| 1,840,876 | Rayburn | Jan. 12, 1932 |
| 1,870,824 | Shepard | Aug. 9, 1932 |
| 1,912,738 | Svenson | June 6, 1933 |
| 2,029,742 | Sieverts | Feb. 4, 1936 |
| 2,190,122 | Mohler | Feb. 13, 1940 |
| 2,262,331 | MacNeil | Nov. 11, 1941 |
| 2,397,480 | Fullerton | Apr. 2, 1946 |
| 2,462,924 | Ungar | Mar. 1, 1949 |

FOREIGN PATENTS

| Number | Country | Date |
|---|---|---|
| 133,893 | Switzerland | Nov. 16, 1929 |
| 253,454 | Great Britain | June 17, 1926 |
| 377,031 | France | June 28, 1907 |
| 592,428 | France | Apr. 30, 1925 |
| 596,140 | France | Aug. 1, 1925 |
| 713,285 | France | Aug. 11, 1931 |
| 741,103 | France | Dec. 2, 1932 |

OTHER REFERENCES

Ser. No. 429,040, Egersdörfer (A. P. C.), published May 11, 1943.